(12) United States Patent
Kostic et al.

(10) Patent No.: US 7,400,901 B2
(45) Date of Patent: *Jul. 15, 2008

(54) WLAN HAVING LOAD BALANCING BASED ON ACCESS POINT LOADING

(75) Inventors: Zoran Kostic, Holmdel, NJ (US); Kin K Leung, Edison, NJ (US); Hujun Yin, Bethlehem, PA (US)

(73) Assignee: AT&T Corp., New York, NY (US)

( * ) Notice: Subject to any disclaimer, the term of this patent is extended or adjusted under 35 U.S.C. 154(b) by 501 days.

This patent is subject to a terminal disclaimer.

(21) Appl. No.: 10/292,862

(22) Filed: Nov. 12, 2002

(65) Prior Publication Data
US 2003/0139197 A1 Jul. 24, 2003

Related U.S. Application Data

(60) Provisional application No. 60/332,957, filed on Nov. 19, 2001.

(51) Int. Cl.
*H04B 7/00* (2006.01)
*H04Q 7/20* (2006.01)

(52) U.S. Cl. ............... 455/525; 455/522; 455/524; 455/434; 455/453; 455/69; 370/236; 370/338; 370/395.21; 370/400

(58) Field of Classification Search ............ 455/525, 455/524, 500, 522, 450, 453, 437, 434, 141, 455/69; 370/338, 395.21, 236, 400
See application file for complete search history.

(56) References Cited

U.S. PATENT DOCUMENTS

| | | | |
|---|---|---|---|
| 5,305,308 A | 4/1994 | English et al. | |
| 5,513,210 A | 4/1996 | Vook et al. | |
| 5,594,731 A | 1/1997 | Reissner | |
| 5,654,959 A | 8/1997 | Baker et al. | |
| 5,812,531 A | 9/1998 | Cheung et al. | |
| 5,815,811 A * | 9/1998 | Pinard et al. | 455/434 |
| 5,844,900 A | 12/1998 | Hong et al. | |
| 5,901,362 A | 5/1999 | Cheung et al. | |
| 5,987,018 A * | 11/1999 | Freeburg et al. | 370/310.2 |
| 6,002,918 A | 12/1999 | Heiman et al. | |
| 6,067,297 A | 5/2000 | Beach | |
| 6,157,668 A * | 12/2000 | Gilhousen et al. | 375/130 |
| 6,374,311 B1 | 4/2002 | Mahany et al. | |
| 6,522,881 B1 * | 2/2003 | Feder et al. | 455/437 |
| 6,580,700 B1 * | 6/2003 | Pinard et al. | 370/332 |
| 6,643,521 B1 * | 11/2003 | Bourgoin et al. | 455/522 |

(Continued)

FOREIGN PATENT DOCUMENTS

EP    1 133 208 A2    9/2001

(Continued)

*Primary Examiner*—Matthew Anderson
*Assistant Examiner*—Shaima Q Aminzay

(57) ABSTRACT

A network having distribution of access point loading includes access points to which mobile stations can associate themselves based upon access point beacon signal levels and loading levels for the various access points. A mobile station receives beacon signals from various access points and determines a signal strength for the received beacon signals. The mobile station also receives access point loading information from the access points. The mobile station associates with an access point based upon the access point beacon signal strengths and the access point loading information.

17 Claims, 2 Drawing Sheets

U.S. PATENT DOCUMENTS

| | | |
|---|---|---|
| 6,842,616 B2 * | 1/2005 | Takano et al. ............ 455/435.2 |
| 6,859,654 B1 | 2/2005 | Reynolds et al. |
| 6,879,579 B1 * | 4/2005 | Myles et al. ................ 370/348 |
| 6,895,258 B1 * | 5/2005 | Scherzer et al. .......... 455/562.1 |
| 7,177,649 B1 | 2/2007 | Nielsen |
| 2002/0045424 A1 * | 4/2002 | Lee .............................. 455/41 |
| 2002/0085498 A1 * | 7/2002 | Nakamichi et al. .......... 370/236 |
| 2002/0110105 A1 * | 8/2002 | Awater et al. ............... 370/338 |
| 2003/0163579 A1 * | 8/2003 | Knauerhase et al. ........ 709/230 |
| 2004/0039817 A1 * | 2/2004 | Lee et al. .................... 709/225 |
| 2004/0053624 A1 * | 3/2004 | Frank et al. ................. 455/453 |
| 2004/0068668 A1 * | 4/2004 | Lor et al. .................... 713/201 |
| 2004/0110524 A1 * | 6/2004 | Takano et al. ............... 455/522 |
| 2006/0007951 A1 * | 1/2006 | Meier ......................... 370/449 |
| 2006/0234754 A1 * | 10/2006 | Takano et al. ............... 455/522 |

FOREIGN PATENT DOCUMENTS

| | | |
|---|---|---|
| EP | 1 156 623 A1 | 11/2001 |
| EP | 1 178 630 A1 | 2/2002 |
| EP | 1 206 070 A2 | 5/2002 |
| EP | 1 207 452 A2 | 5/2002 |
| WO | WO 98/35453 | 8/1998 |
| WO | WO 02/13429 A1 | 2/2002 |

* cited by examiner

WLAN HAVING LOAD BALANCING BASED ON ACCESS POINT LOADING

CROSS REFERENCE TO RELATED APPLICATIONS

The present invention claims the benefit of U.S. Provisional Patent Application No. 60/332,957, filed on Nov. 19, 2001, which is incorporated herein by reference.

STATEMENT REGARDING FEDERALLY SPONSORED RESEARCH

Not Applicable.

FIELD OF THE INVENTION

The present invention relates generally to communication networks and, more particularly, to wireless communication networks.

BACKGROUND OF THE INVENTION

Wireless communication networks for providing links to mobile stations are well known in the art. In one type of wireless network, a series of access points provide wireless connections to various mobile users. For example, a building can include access points located at strategic locations to serve mobile users as they move throughout the building. The mobile users migrate from access point to access point based upon the strength of beacon signals from the various access points. That is, the mobile stations use the strength of the beacon signals to select the best access point at a given point in time.

With changes in the channel environment and number of users in a Wireless Local Area Network (WLAN) system, different access points experience different traffic loading. That is, the number of users served by each of the access points varies over time. Those access points that serve a relatively high number of stations (hot spots) can become overloaded and experience reduced performance. For example, an access point can become overloaded during a meeting in a conference room proximate the access point when the attendees attempt to connect their laptops to the corporate intranet.

It would, therefore, be desirable to adjust the loading of network access points to reduce network congestion.

SUMMARY OF THE INVENTION

The present invention provides a wireless network having mobile stations that determine to which access point they will associate based upon received beacon signal power levels and access point load information sent to the mobile station. With this arrangement, overall network performance is enhanced by more efficient access point loading. While the invention is primarily shown and described in conjunction with wireless access points having beacons, it is understood that the invention is applicable to wireless networks in general in which it is desirable to distribute loading.

In one aspect of the invention, network wireless access points transmit beacon signals to mobile stations within their coverage area and the mobile stations determine the strength of each received beacon signal. Based upon the beacon signal strength, a particular mobile station can determine which access points the mobile station can associate with. The access points also broadcast, such as in a Beacon frame, loading level information for the access point. The mobile station then selects an access point based upon beacon signal strength and access point loading. By taking into consideration access point loading levels, network congestion due to overloaded access points can be reduced.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
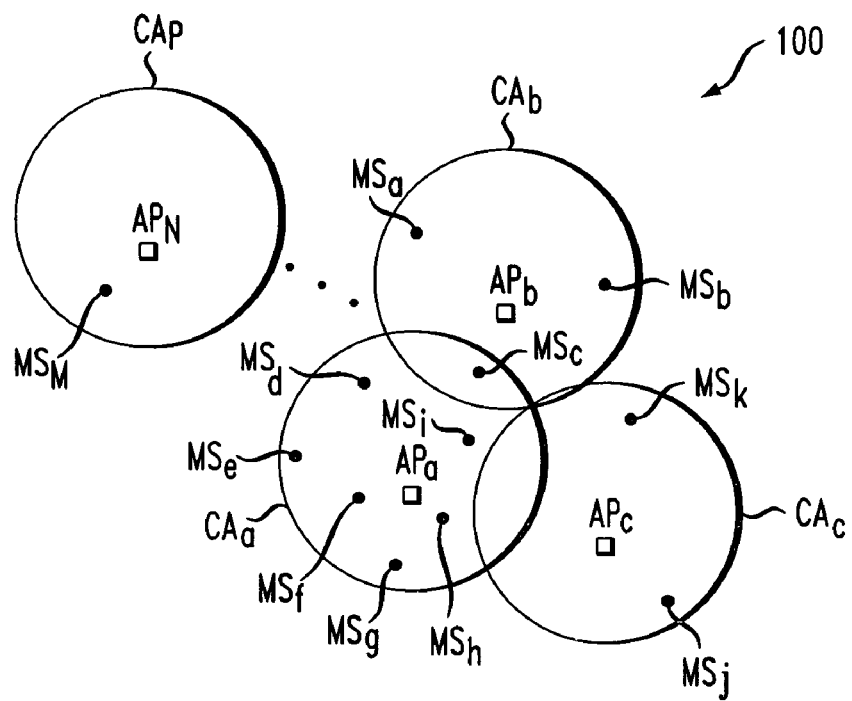
FIG. 1 is a schematic depiction of a wireless network having access point selection by mobile stations in accordance with the present invention.

FIG. 1 shows an exemplary wireless network 100 having access point load balancing in accordance with the present invention. The network 100 includes a series of access points $AP_{a-N}$ having associated coverage areas $CA_{a-P}$ serving the various mobile stations MSa-M. Access point load balancing is achieved by each of the mobile stations $MS_{a-M}$ determining to which one of the access points $AP_{a-N}$ the mobile station should associate with based upon access point beacon signal power levels and access point loading information, as described more fully below.

In general, each mobile station MS receives a beacon signal from access points $Ap_{a-N}$ having a coverage area $CA_{a-P}$ in which the mobile station is located. The access points AP also broadcast, such as in a so-called Beacon Frame, loading information for the access point, as described further below. Mobile stations $Ms_{a-M}$ that receive multiple access point beacon signals above a predetermined threshold level, for example, can select one of these access points based upon the load level of the access points to optimize overall access point loading. By distributing mobile station associations based on access point loading, network congestion is reduced and overall network performance is enhanced.

For example, as illustrated in FIG. 1, a first mobile station $MS_c$ may be located within the coverage areas $CA_{a,b}$ of associated first and second access points $AP_{a,b}$. The first mobile station $MS_c$ receives a beacon signal of acceptable power level, e.g., above a predetermined threshold, from the first and second access points $AP_{a,b}$. In an exemplary embodiment, the first and second access points $AP_{a,b}$ also broadcast their loading levels in a Beacon Frame that is received by the first mobile station $MS_c$. Since the first access point $AP_a$ supports significantly more mobile stations, e.g., $MS_{d-i}$, than the second access point $AP_b$ (supports $MS_{a,b}$), the first mobile station $MS_c$ associates itself with the second access point $AP_b$.

It is understood that the parameters used to determine which access point a particular mobile station should associate with can vary. Exemplary parameters include loading of the access point (number of associated stations), total traffic intensity through the access point, reports from individual stations, the measurement of the received signal power from a subset of stations, mobile station priority weighting, access point priorities, and overall network loading.

It is further understood that the term "mobile station," as used herein, should be construed broadly to include various wireless devices, such as laptops, Personal Digital Assistants (PDAs), mobile phones, and the like. Similarly, the term "access point" should be broadly construed to include transmitters/receivers in general that can provide a radio link with a mobile station.

Before describing further details of the present invention, some basic concepts are now described. In conventional wireless networks having mobile stations served by various access points, such as in a 802.11 network, there is a standard procedure by which mobile stations associate themselves with an access point. The IEEE 802.11 standard is defined in International Standard ISO/IEC 8802-111, "Information Technology—Telecommunications and Information Exchange Area Networks," 1999 Edition, which is hereby incorporated by reference in its entirety. Before a mobile station associates with an access point, it obtains information of nearby access points by scanning the frequency channels for their beacons. The access points typically send out beacon frames periodically.

In traditional WLANs, such as 802.11 networks, beacon powers of access points are kept at a fixed level. The mobile station simply chooses the access point with the best (highest) signal strength for association. However, it is possible that one access point may be already overloaded, although it has the strongest signal strength to the mobile station.

While the following descriptions are applicable to 802.11 WLANs, it is understood that the invention applies to wireless networks in general using similar formats and mechanisms. Table 1 below shows the beacon frame body of a management frame of subtype Beacon with each of the listed components specified in the 802.11 standard.

TABLE 1

Beacon frame body

| Order | Information | Notes |
|---|---|---|
| 1 | Timestamp | Time/day/etc information |
| 2 | Beacon interval | Time between beacon intervals |
| 3 | Capability information | Resource parameters, polling parameters, etc. |
| 4 | SSID | Service Set ID (Wireless Network Name) |
| 5 | Supported rates | Data Rates supported by the system/device |
| 6 | FH Parameter Set | The FH Parameter Set information element is present within Beacon frames generated by STAs (Mobile STAtions) using frequency-hopping (FH) PHYs (PHYsical layer modulations) |
| 7 | DS Parameter Set | The DS Parameter Set information element is present within Beacon frames generated by STAs using direct sequence (DS) PHYs |
| 8 | CF Parameter Set | The CF (Contention Free) Parameter Set information element is only present within Beacon frames generated by APs (Access Points) supporting a PCF (Point Coordination Function) |
| 9 | IBSS Parameter Set | The IBSS (Independent Basic Service Set) Parameter Set information element is only present within Beacon frames generated by STAs in an IBSS |
| 10 | TIM | The TIM (Traffic Information Map) information element is only present within Beacon frames generated by APs |

Typically, the mobile station can operate in either Passive Scanning mode or Active Scanning mode. In Passive Scanning mode, the mobile station listens to each channel scanned for no longer than a maximum duration defined by the ChannelTime parameter. The Active Scanning mode involves the generation of a Probe Request frame by the mobile stations, which is shown in Table 2 below, and the subsequent processing of a received Probe Response frame, which is shown in Table 3, by the access point.

TABLE 2

Probe Request frame body

| Order | Information |
|---|---|
| 1 | SSID |
| 2 | Supported rates |

TABLE 3

Probe Response frame body

| Order | Information | Notes |
|---|---|---|
| 1 | Timestamp | Time/day/etc. information |
| 2 | Beacon interval | Time between beacon intervals |
| 3 | Capability information | Resource parameters, polling parameters, etc. |
| 4 | SSID | Service Set ID (Wireless Network Name) |
| 5 | Supported rates | Data Rates supported by the system/device |
| 6 | FH Parameter Set | The FH Parameter Set information element is present within Beacon frames generated by STAs using frequency-hopping PHYs |
| 7 | DS Parameter Set | The DS Parameter Set information element is present within Beacon frames generated by STAs using direct sequency PHYs |
| 8 | CF Parameter Set | The CF Parameter Set information element is only present within Beacon frames generated by APs supporting a PCF |
| 9 | IBSS Parameter Set | The IBSS Parameter Set information element is only present within Beacon frames generated by STAs in an IBSS |

Conventionally, after scanning the access point beacons, the mobile station adopts the BSSID (Basic Service Set ID: Access Point ID) and channel synchronization information in a Beacon (passive) or Probe Response (active) coming from the access point with the best signal strength. An Association/Reassociation Request is then issued by the mobile station as it attempts to associate with the selected access point. The access point then responds with an Association Response. The corresponding Association Request and Association Response frame formats are shown below in Table 4 and Table 5, respectively. It is understood that further actions, such as authentication, take place before or after the association phase.

TABLE 4

Association/Reassociation Request frame body

| Order | Information |
|---|---|
| 1 | Capability information |
| 2 | Listen interval |
| 3 | SSID |
| 4 | Supported rates |

TABLE 5

Association Response frame body

| Order | Information |
|---|---|
| 1 | Capability information |
| 2 | Status code |
| 3 | Association ID (AID) |
| 4 | Supported rates |

In accordance with the present invention, the mobile station selects an access point based upon beacon signal strength and access point loading levels.

Figure 2:
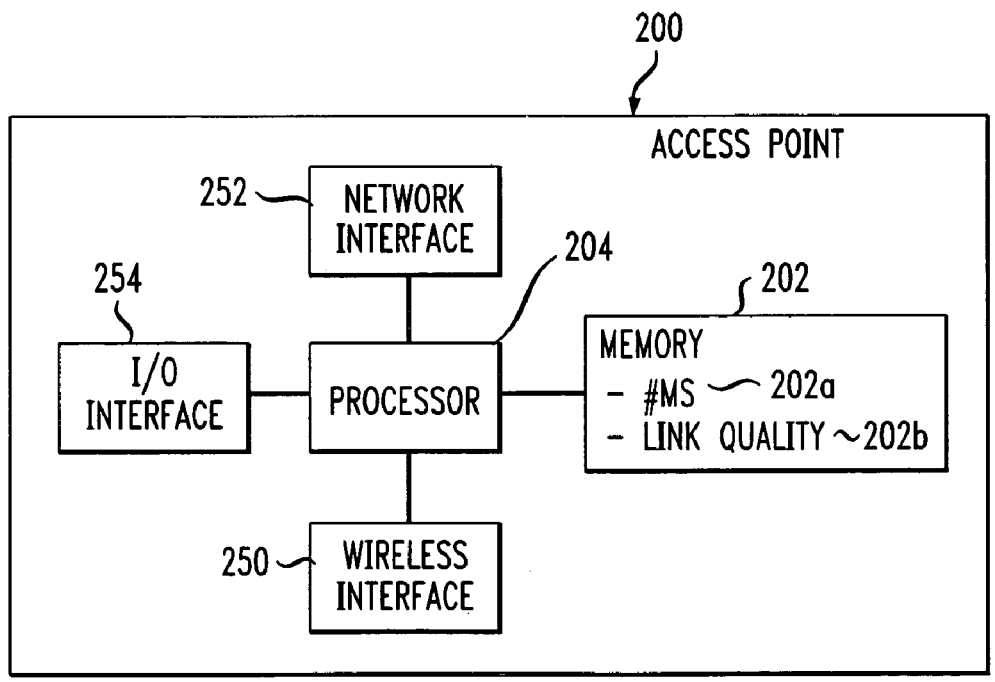
FIG. 2 is a schematic block diagram of an exemplary access point that can form a part of the network of FIG. 1.

FIG. 2 shows an exemplary access point 200 having a mobile station memory database 202 and a processor 204 for controlling the overall operation of the access point. The database 202 can contain various loading information including loading level, which can be provided as the number of currently associated mobile stations 202a, the link quality 202b, and the like. Further such information, such as mobile station priority, the number of access points that a given mobile station can "hear", etc., will be readily apparent to one of ordinary skill in the art.

The access point 200 includes a module 206 for assessing the medium load condition. More particularly, the module can determine the number of mobile stations associated with the access point, their bandwidth usage, transmission queue length, number of error packets compared to the total traffic, and the like. This information can be used to determine a loading level for the access point 200, which can be used in access point selection, as described further below.

The access point 200 can also include conventional components, such as a wireless interface 250 having one or more RF transceivers, a network interface 252 for interacting with a wired network, and an I/O interface 254 for communicating with various components, such as peripheral equipment.

In an exemplary embodiment, frequency option information can be conveyed in the Association/Reassociation request frame, which is shown above in Tables 45. These two management frames contain the same Capability Information field, which is used to indicate requested or advertised capabilities. In an illustrative embodiment, the length of the Capability Information field is two octets.

Figure 3:
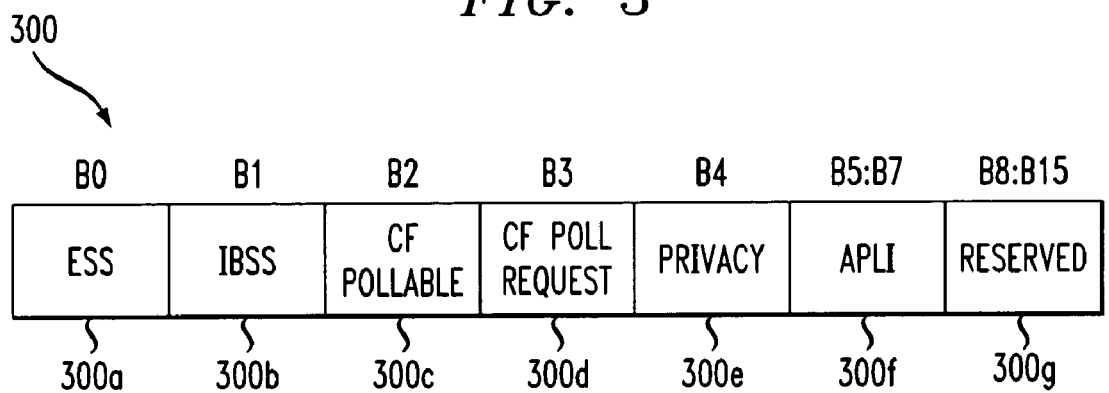
FIG. 3 is a pictorial representation of an exemplary capability field that can be contained in a message exchanged by an access point and a mobile station in accordance with the present invention.

FIG. 3 shows an exemplary Capability Information field 300 having sub fields of ESS 300a, IBSS 300b, CFPollable 302c, CFPoll Request 302d, and Privacy 302e, together using five of the sixteen total bits. In an exemplary embodiment, three bits form a further subfield APLI 300f indicating the loading level of the access point. It is understood that the loading level can be presented in a variety of formats including raw number of associated mobile stations, discrete values indicative of loading level, percent of rated capacity, and the like. The remaining bits 300g of the Capability Information field 300 are reserved.

Figure 4:
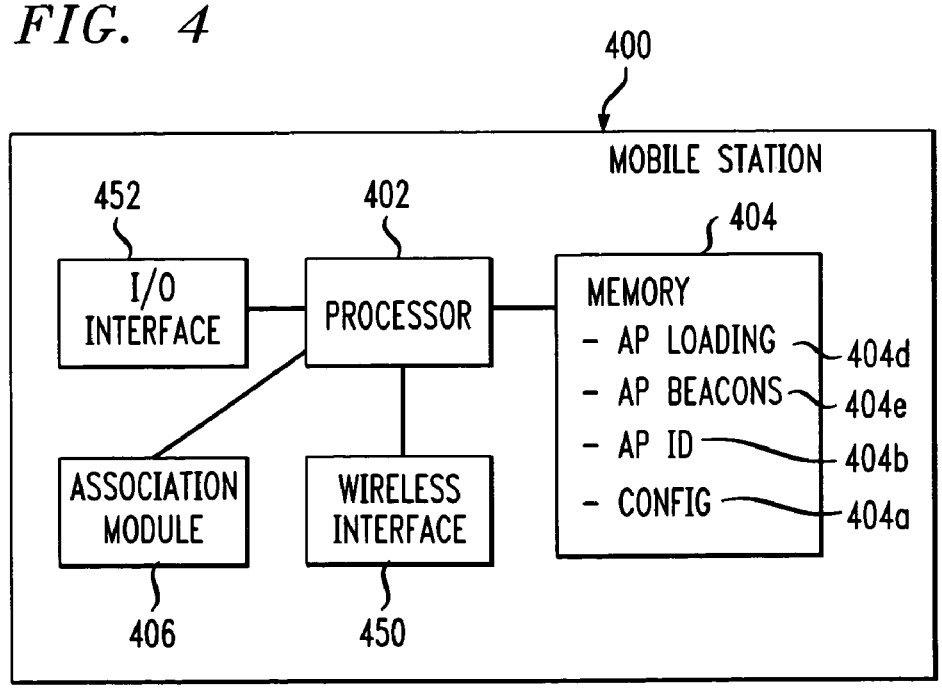
FIG. 4 is a schematic depiction of a mobile station that can form a part of the network of FIG. 1.

FIG. 4 shows an exemplary mobile station 400 having load-based access point selection in accordance with the present invention. The mobile station 400 includes a processor 402 for controlling the overall device operation and a memory 404 for storing various information, such as configuration parameters 404a, access point IDs 404b, access point beacon signal power levels 404c, and access point loading level information 404d. The mobile station 400 can further include a conventional wireless interface 450 for transmitting and receiving radio frequency signals, and an I/O interface 452.

The mobile station 400 further includes an association module 406 for selecting an access point for association based upon the detected access point beacon signal power levels and access point loading. It is understood that the association module can select access points using a variety of functions using a range of parameters.

For example, assume that the beacons of access points $AP_1$, $AP_2$, ... $AP_N$ can be received by a given mobile station. For each access point AP, through its beacon signal, the mobile station can obtain various parameters, such as signal strength (RSSI), number of associated stations, traffic intensity and other related parameters. These parameters can be referred to as the signature vector $V_1$ for the access point $AP_i$. A cost function $f(V_1)$ can be defined to calculate the cost if the mobile station associates with a given access point $AP_i$. Once the cost function is defined as desired, the association module of the mobile station chooses the access point AP with the minimal cost of association.

In one particular embodiment, the association module uses the number of stations associated with the $AP_s$ as the sole parameter of the cost function. Let $n_1, n_2, \ldots n_N$ be the number of stations associated with $AP_1, AP_2, \ldots AP_N$, and let $f(V_1) = n_j$. Then the association module of the mobile station chooses the access point AP with the fewest number of associated stations for association, i.e., AP_selected=$\{AP_j | n_j = \min\{n_1, n_2, \ldots n_N\}\}$, which is known as the Join-the-shortest-queue (JSQ) algorithm.

This algorithm provides a mechanism for the mobile stations to choose the best server available and enables the mobile stations to explore the spatial diversity of a distributed network.

In another embodiment, it is assumed that there is an acceptable level of beacon signal power level $P_a$. When a mobile station receives beacon signals from multiple access points, each of which has a power level equal or greater than $P_a$, the access point with the lowest traffic loading among such plurality of access points is selected for association with the mobile station.

In one embodiment, the access point assesses the medium condition and inserts loading information in the Capability Information field (FIG. 3) of a Beacon/Probe Response frame. While in the scanning mode, the mobile station receives and records the access point loading information delivered in the Beacon/Probe Response frame. The mobile station can then evaluate the information and select an access point based upon beacon signal strength and access point loading levels, as described above.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of distributing access point loading in a wireless network, comprising:
    receiving beacon signals from a plurality of access points;
    determining a signal strength for the received beacon signals;
    receiving access point loading information from the plurality of access points, the access point loading information comprising a transmission queue length and a number of transmitted error packets; and
    associating with a first one of the plurality of access points based upon the beacon signal strengths, the access point loading information, mobile station priority weighting, access point priorities, and overall network loading.

2. The method according to claim 1, further including associating with the first one of the plurality of access points when a beacon signal strength of the first one of the plurality of access points is less than a second one of the plurality of access points.

3. The method according to claim 2, wherein a loading level of the second one of the plurality of access points is greater than a loading level of the first one of the plurality of access points.

4. The method according to claim 1, further including receiving the access point loading information in a beacon frame.

5. The method according to claim 1, further including associating with the first one of the plurality of access points where at least two of the beacon signal strengths are above a predetermined level.

6. The method according to claim 5, further including associating with the first one of the plurality of access points which has a fewest number of associated mobile stations.

7. The method according to claim 1, further including associating with the first one of the plurality of access points based upon a cost function.

8. The method according to claim 7, wherein the cost function includes a parameter corresponding to the access point loading information.

9. The method according to claim 7, further including associating with the first one of the plurality of access points with the cost function using one or more parameters including one or more of access point traffic intensity and access point signal strength levels.

10. The method according to claim 1, wherein the wireless network is a 802.11 network.

11. The method according to claim 1, further including receiving the access point loading information in capability information field.

12. An access point, comprising:

a processor;

a module coupled to the processor for obtaining parameters, said parameters comprising load level information of the access point, access point priority, and overall network loading, the load level information comprising a transmission queue length and a number of transmitted error packets;

a memory coupled to the processor for storing the parameters; and a means for transmitting the access point parameters to mobile stations.

13. The access point according to claim 12, wherein the memory stores link quality information.

14. The access point according to claim 12, wherein the access point forms a part of an 802.11 network.

15. A mobile station, comprising a processor;

a memory coupled to the processor for storing access point loading information, access point beacon signal strength information, mobile station priority weighting, access point priorities, and overall network loading, the loading information comprising a transmission queue length and a number of transmitted error packets; and a means for selecting to associate with a first one of a plurality of access points based upon the beacon signal strength information, the access point loading information, the mobile station priority weighting, access point priorities, and overall network loading.

16. The mobile station according to claim 15, further including means for selecting to associate with the first one of the plurality of access points when a beacon signal strength of the first one of the plurality of access points is less than a second one of the plurality of access points.

17. The mobile station according to claim 16, wherein a loading level of the second one of the plurality of access points is greater than a loading level of the first one of the plurality of access points.

* * * * *